E. McCAFFRAY.
SCREW BUSHING FOR FASTENING BOXES.
APPLICATION FILED NOV. 30, 1915.
1,251,676.
Patented Jan. 1, 1918.
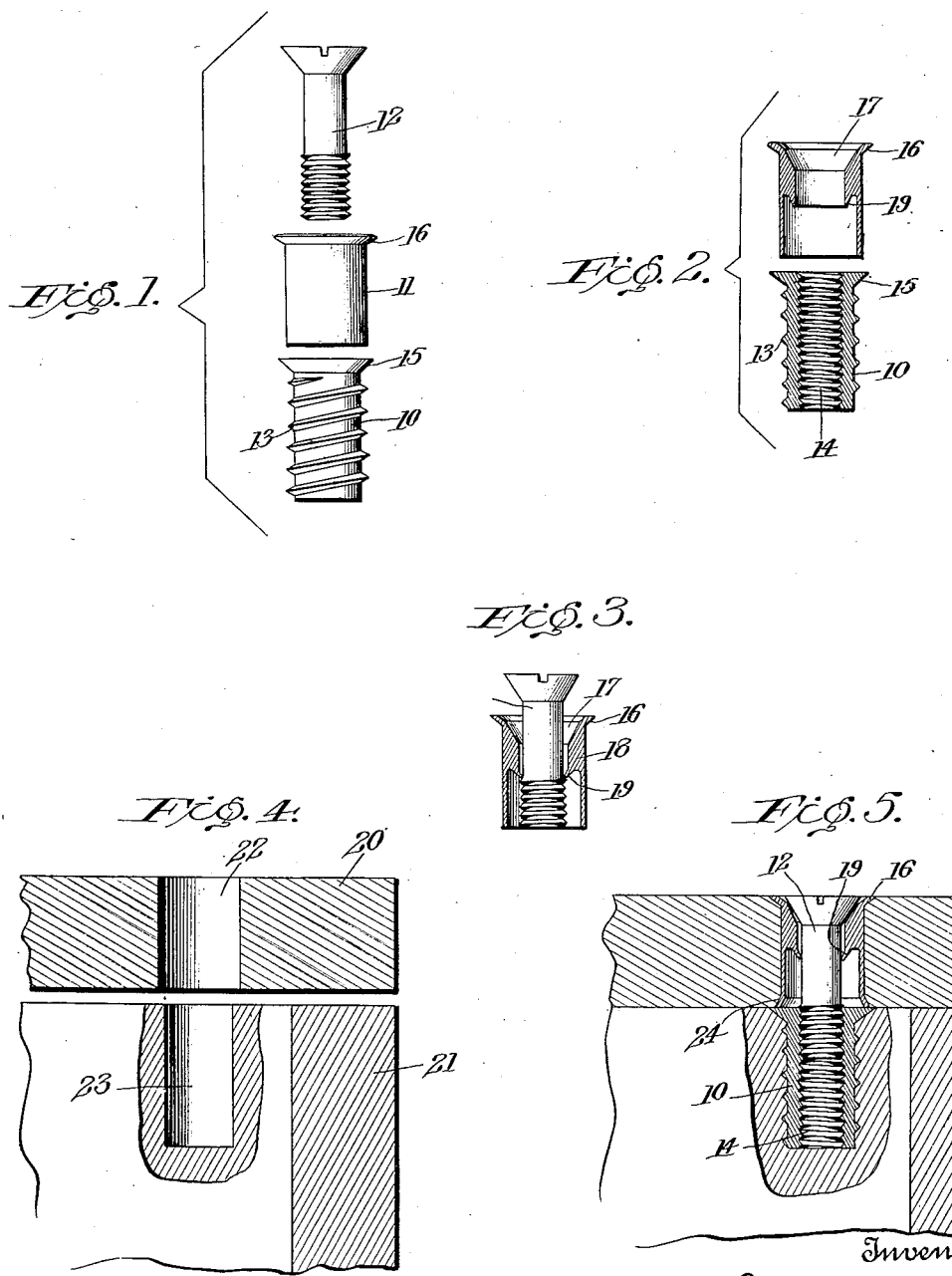

UNITED STATES PATENT OFFICE.

EDMUND McCAFFRAY, OF MOUNT WASHINGTON, MARYLAND, ASSIGNOR TO HAMILTON CASSARD, OF BALTIMORE, MARYLAND.

SCREW-BUSHING FOR FASTENING BOXES.

1,251,676.  Specification of Letters Patent.  Patented Jan. 1, 1918.

Application filed November 30, 1915. Serial No. 64,330.

*To all whom it may concern:*

Be it known that I, EDMUND McCAFFRAY, a citizen of the United States, residing at Mount Washington, Baltimore county, State of Maryland, have invented certain new and useful Improvements in Screw-Bushings for Fastening Boxes, of which the following is a specification.

This invention relates to screw fastening devices, particularly to devices of this character which are adapted to be used in fastening the lids on boxes, or the various parts of knock-down cases together, or in detachably fastening together any two members of like articles which are made of wood or similar comparatively soft material.

Wooden shipping cases, such as piano boxes and ammunition chests, are often strongly made and adapted to be used over and over again, and the factor which often determines the life of the case is not the breaking of the material itself due to handling, but the wearing out of the material along the edges which are fastened together, due to the fact that screws cannot safely be used in the same holes more than two or three times, and nails only a single time, because of the soft nature of the material. As a consequence, the position of the screws or nails must be shifted continually in refastening the parts together until the available positions for the fastening devices have all been used. The case or box is then useless and must be thrown away. Not only is the case rendered ultimately useless in this way but the holes left by the shifting of the fastening devices detract greatly from its appearance.

The principal object of my invention is to provide means whereby the parts of a box may be secured together by screws in such a way that they may be taken apart and fastened together again an unlimited number of times, the screws each time entering the same holes in the members.

Another object of my invention is to provide means whereby screws used in securing the parts of the box together are held to one of the parts at all times and so can not become lost or mislaid.

In the drawings,

Figure 1 is a side view of the parts of my device;

Fig. 2 is a longitudinal section of two of the parts;

Fig. 3 is a longitudinal section of two of the parts assembled;

Fig. 4 is a view of a corner of a box, part being broken away, showing holes prepared therein for the reception of my device;

Fig. 5 is a similar view showing my device secured in operative position.

Referring to Figs. 1 to 5, inclusive, of the drawings, it will be seen that my device comprises three principal parts, a socket 10, a bushing 11, and a machine screw 12. These parts are of any suitable metal, the bushing and socket being preferably made of brass and the screw of steel. The socket 10 is provided on its outer surface with screw threads 13 of comparatively long pitch and on its interior with screw threads 14 of short pitch and has at its upper end an annular flange 15. The bushing 11 has a cylindrical outer surface with an annular flange 16 at its upper end, but instead of having a plane upper surface the bushing has a counter-sunk recess 17 at its upper end adapted to receive the head of a screw. The walls of the upper part of the bushing are left comparatively thick, as shown at 18 in the drawings, while the walls of the lower half of the bushing are thin in order that the lower edge of the bushing may be swaged outwardly to form a flange adapted to coöperate with the flange 16 to hold the bushing in place in a wooden member.

The diameter of the bore of the upper part of the bushing is large enough to permit of the passage of the screw 12, the diameter of the threaded portion of the screw being only slightly less than the diameter of the restricted portion of the bore of the bushing. Formed on the lower end of the thickened wall 18 is a flange 19 which projects vertically downward parallel to the walls of the bushing, as shown in Fig. 2. This flange 19 is comparatively thin and is adapted to be swaged by suitable tools toward the shank of the screw 12 after the latter has been inserted in the bushings. The flange in this position does not prevent the limited longitudinal movement of the screw in the bushing but does prevent the withdrawal of the screw, as it is impossible to draw the threaded portion of the screw past the flange. The lengths of the threaded and unthreaded portions of the screw 12 are such that when the screw is drawn upwardly through the bushing as far as the flange 19 will permit it to be drawn, the flat lower end of the screw will be in or above the plane of the lower end of the bushing.

In the application of my device to the lid 20 and to the body 21 of the box, Fig. 4, a hole 22 having a diameter equal to that of the bushing is bored through the cover of the box and a corresponding hole 23 having a diameter equal to that of the socket, exclusive of the screw threads 13, is bored in the upper edge of the side wall of the box. The socket is then screwed into the hole 23 until the upper end of the socket is flush with the top edge of the box.

The bushing 11 is then inserted into the hole 22, with the top of the bushing flush with the surface of the cover. The bottom of the bushing is then swaged outwardly by any suitable tool to form an annular flange 24, Fig. 5, which, coöperating with the flange 16, permanently connects the bushing with the cover.

The screw 12 may be inserted into the bushing and secured therein either before the latter is fastened to the cover or afterward, as desired. In securing the screw 12 within the bushing it is inserted until its threaded portion is below the flange 19. This flange is then swaged toward the shank of the screw a sufficient distance to prevent the screw threads from passing through the restricted opening, but not so far as to impede the free movement of the unthreaded portion of the screw.

The holes 22 and 23 in the lid and side wall of the box, respectively, are so arranged that when the lid is in its proper position on the box the axes of the holes, and hence the axes of the bushing and socket, are coincident so that when the screw is turned it will engage the threads on the socket. As the lower flange 24 of the bushing bears directly on the upper flange 15 of the socket, the force exerted on the screw, which tends to bring the cover 20 tightly against the box 21, will not have a tendency to draw the socket 10 out of the hole 23 or to force the bushing 11 through the cover 20.

In fastening the cover on a box, a sufficient number of the devices are provided around the edge of the cover to securely hold the cover in place. When the cover is to be removed from the box the screws are simply turned until the threaded portions have been completely withdrawn from the sockets. The cover may then be lifted off.

As the screws can at no time be accidentally withdrawn from the socket they cannot be lost, which feature is of great desirability where the boxes are unpacked at a distance from some place where screws may be obtained. Furthermore, it is apparent that my devices are neat and attractive and will add materially to the appearance of any box upon which they are used. My fastening device is simple, very effective and cheap to manufacture and may be used in a great variety of ways of which fastening a lid to a box is simply an example.

Having thus described the invention, what is claimed and desired to be secured by Letters Patent is:

The combination of a wooden box member, a wooden lid member therefor, a self-retaining internally threaded metal socket in one of said members, a bushing permanently secured in the other member, and a screw extending through the bushing and adapted to the socket, said bushing having a flange on its inner wall adapted to be swaged inwardly to interlock with the screw to prevent loss of the latter while permitting free longitudinal movement thereof.

In testimony whereof I affix my signature.

EDMUND McCAFFRAY.